United States Patent [19]

Nilssen

[11] Patent Number: 4,502,107
[45] Date of Patent: Feb. 26, 1985

[54] FULL-BRIDGE ELECTRONIC INVERTER CIRCUIT

[76] Inventor: Ole K. Nilssen, Caesar Dr., Rte. 5, Barrington, Ill. 60010

[21] Appl. No.: 419,495

[22] Filed: Sep. 17, 1982

[51] Int. Cl.$^3$ ............................................ H02M 7/537
[52] U.S. Cl. .................................................... 363/133
[58] Field of Search ............... 363/123, 131, 132, 133, 363/56

[56] References Cited

U.S. PATENT DOCUMENTS

| | | | |
|---|---|---|---|
| 3,263,122 | 7/1966 | Genuit | 363/132 |
| 3,346,798 | 10/1967 | Dinger | 363/56 |
| 4,279,011 | 7/1981 | Nilssen | 363/133 |

Primary Examiner—William M. Shoop
Assistant Examiner—Anita M. Ault

[57] ABSTRACT

In many applications of electronic inverters, especially in applications involving inversion of relatively high levels of power, it would be desirable to use full-bridge inverters rather than half-bridge or regular parallel push-pull inverters.

In its preferred embodiment, subject invention constitutes a self-oscillating inverter circuit based on a full-bridge configuration of four switching transistors. Positive feedback and avoidance of commutation overlaps are accomplished by using four non-coupled saturable current transformers—one such transformer for each transistor.

By arranging for two of these saturable transformers to require fewer volt-seconds for saturation than do the other two transformers, coupled with the use of a shunt-connected inductor across the output, the inverter output voltage—rather than being a simple squarewave—is made to alternate between three magnitude levels: a maximum negative voltage level, a zero voltage level, and a maximum positive voltage level. The resulting output voltage has fewer harmonic components than do the simple squarewave. By having the zero voltage levels occupy approximately one third of the total time of the net resulting output voltage cycles, a minimum of harmonics results.

12 Claims, 3 Drawing Figures

FULL-BRIDGE ELECTRONIC INVERTER CIRCUIT

BACKGROUND OF THE INVENTION

1. Field of the Invention

The present invention relates to electronic inverter circuits, particularly of a type classifiable as self-oscillating full-bridge inverter circuits.

2. Description of Prior Art

To the best of my knowledge, no self-oscillating full-bridge inverter product is available for purchase or has been described in published literature.

Rationale Related to the Invention

In many applications it would be clearly desirable to use a full-bridge inverter rather than a half-bridge or a regular parallel push-pull inverter. The reason for this could be one or more of the following: it could be related to a need for handling more power than can be handled with half-bridge or parallel push-pull inverters within the limits of available switching transistors; it might be associated with a need for minimizing ripple current in the DC power supply (which is often a problem, especially with half-bridge inverters); it could be connected with a need to minimize the possibility of voltage transients across the transistors (which is often a problem with parallel push-pull inverters); it could be connected with a need to achieve a higher-magnitude AC output voltage than is achievable from a half-bridge inverter; it might relate to a need to avoid having to use an output transformer or inductance means (which is an absolute requirement with parallel push-pull inverters); it might be related to a need to avoid the use of bi-filar windings in any required transformer (as must generally be used in connection with parallel push-pull inverters); it might be associated with a need for minimizing the size or improving the efficiency of any required transformer—especially as compared with parallel push-pull inverters; or it could be connected with a need to invert a DC voltage of larger magnitude than would be possible (within the voltage limits of available transistors) with parallel push-pull inverters; etc.

However, desirable as they may be, inverter circuits of the full-bridge variety are not commonly used— probably because they have been difficult to make within acceptable cost and complexity limits.

SUMMARY OF THE INVENTION

Objects of the Invention

A first object of the present invention is that of providing a full-bridge electronic inverter circuit.

A second object is that of providing a full-bridge electronic inverter circuit that is self-oscillating.

A third object is that of providing an electronic inverter circuit that is particularly capable of inverting high levels of electric power.

A fourth object is that of providing an electronic inverter circuit that is capable of inverting voltages of higher magnitudes than can be accommodated by most common types of electronic inverter circuits.

These as well as other objects, features and advantages of the present invention will become apparent from the following description and claims.

BRIEF DESCRIPTION

Subject invention relates to a self-oscillating full-bridge electronic inverter circuit comprising four common switching transistors in bridge configuration. Positive feedback and frequency determination is accomplished by way of four saturable non-coupled current transformers—one for each switching transistor. By using one such feedback transformer for each transistor, the so-called common-mode-conduction problem often associated with commutating push-pull inverters (of whatever type they be) is solved. Moreover, by making these saturable transformers pairwise saturate at different volt-second amounts, coupled with the use of a shunt-connected inductor across the output, the inverter output voltage—rather than being a simple squarewave—is made to alternate between three magnitude levels: a maximum negative voltage level, a zero voltage level, and a maximum positive voltage level. By having the zero voltage levels occupy approximately one third of the total time of the resulting output voltage, this output voltage will contain far fewer harmonic components than does a simple squarewave.

According to the preferred embodiment of the invention, an electronic inverter circuit of the type described above contains the following key elements:

(a) A pair of bus bars operative to connect with a source of DC voltage;

(b) A first, second, a third, and a fourth switching transistor connected together in bridge configuration, pairwise series-connected across said pair of bus bars;

(c) A first, a second, a third, and a fourth saturable positive feedback current-transformer, each such transformer having an input winding and an output winding, their output windings respectively connected in circuit with the base-emitter junction of said first, second, third, and fourth transistor;

(d) Load means coupled in parallel-combination with an inductance means, with said parallel-combination connected in bridge fashion between the two pairs of series-connected transistors;

(e) Means for applying the resulting load current to the the series-connected input windings of the four feedback transformers; and (f) Means for triggering the inverter into oscillation.

DESCRIPTION OF THE PREFERRED EMBODIMENT

Figure 1:
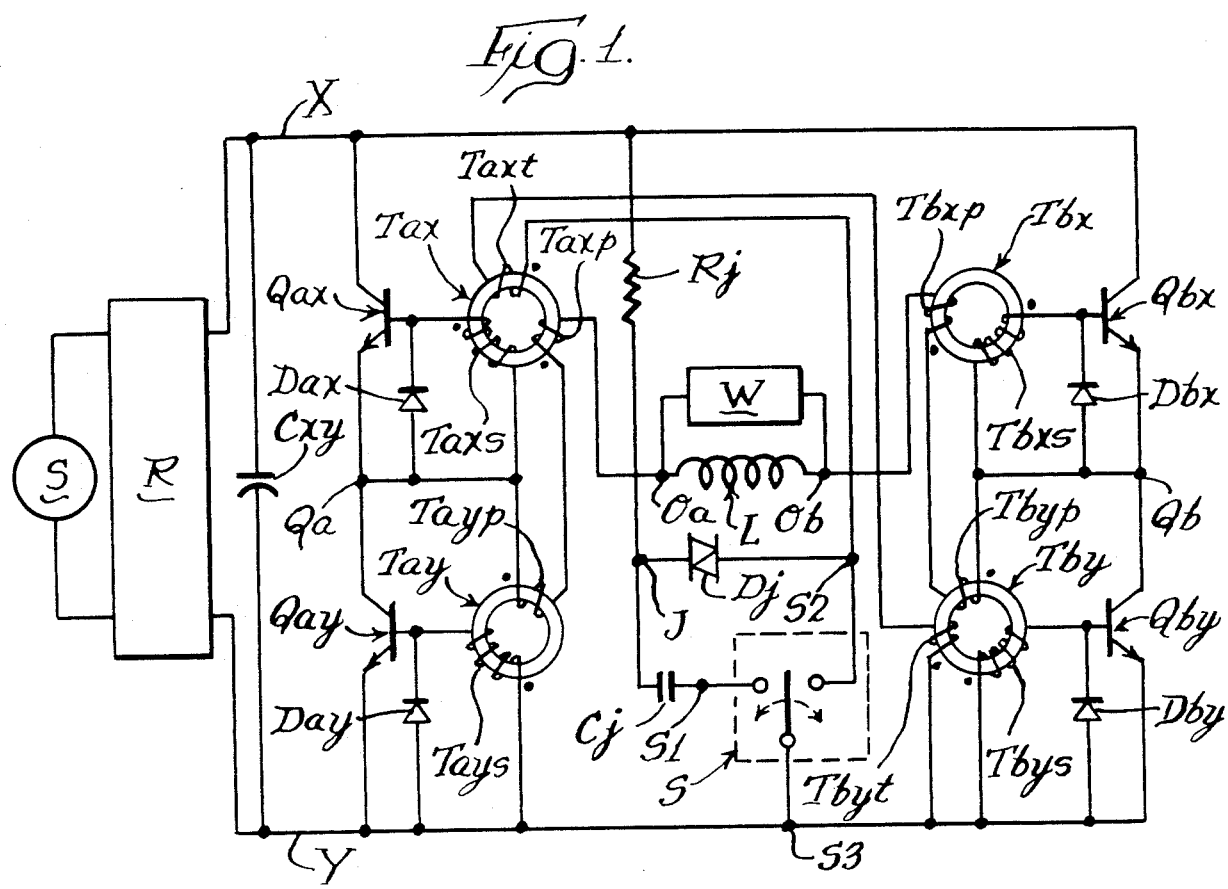
FIG. 1 schematically illustrates the preferred embodiment of the invention, showing a self-oscillating full-bridge inverter circuit with a separate individual saturable feedback current-transformer for each of the four transistors.

In FIG. 1, a source S of 120 Volt/60 Hz voltage is applied to a rectifier means R, the rectified output of which is applied to inverter bus bars X and Y, respectively—with bus bar X carrying the B+ voltage. An energy-storing filter capacitor Cxy is connected between bus bars X and Y.

A first pair of switching transistors Qax and Qay are connected as follows: Qax is connected with its collector to bus bar X and its emitter to a junction Qa; Qay is connected with its collector to junction Qa and its emitter to bus bar Y. A second pair of switching transistors Qbx and Qby are connected similarly: Qbx is connected with its collector to bus bar X and its emitter to a junction Qb; Qby is connected with its collector to junction Qb and its emitter to bus bar Y.

A first pair of saturable feedback transformers Tax and Tbx have primary windings Taxp and Tbxp and secondary windings Taxs and Tbxs, respectively. A second pair of saturable feedback transformers Tay and Tby have primary windings Tayp and Tbyp and secondary windings Tays and Tbys, respectively.

In addition, transformer Tax has a tertiary winding Taxt, and transformer Tby has a tertiary winding Tbyt.

Primary windings Taxp and Tayp are connected in series with one another and between junction Qa and a first output terminal Oa. Primary windings Tbxp and Tbyp are similarly connected in series with one another and between junction Qb and a second output terminal Ob.

Secondary winding Taxs is connected between the base and the emitter of transistor Qax; secondary winding Tays is connected between the base and the emitter of transistor Qay; secondary winding Tbxs is connected between the base and the emitter of transistor Qbx; and secondary winding Tbys is connected between the base and the emitter of transistor Qby.

A resistor Rj is connected between bus bar X and a junction J; a capacitor Cj is connected between junction J and terminal S1 of a three-terminal momentary switch S; and a Diac Dj is connected between junction J and terminal S2 of switch S. The third terminal S3 of switch S is connected to bus bar Y.

Tertiary windings Taxt and Tbyt are connected in series with one another and between terminal S2 and bus bar Y.

Diodes Dax, Day, Dbx, and Dby are connected across the base-emitter junctions of transistors Qax, Qay, Qbx, and Qby, respectively.

An inductor means L and a load W are connected in parallel between output terminals Oa and Ob.

The operation of the circuit of FIG. 1 may be explained as follows.

By actuating switch S for a brief period of time, such that terminal S1 connects with bus bar Y, triggering pulses will be generated by the combined action of Rj, Cj and DJ: Rj charges capacitor Cj to a voltage high enough to reach the break-over voltage of Diac Dj; which, upon break-over, causes capacitor Cj to discharge into the series-connected tertiary windings Taxt and Tbyt. With transformer winding polarities as shown, the discharge of capacitor Cj will cause brief positive voltage pulses at the base-emitter junctions of transistors Qax and Qyb; which voltage pulses will cause these two transistors to start conducting. Once these transistors conduct, positive feedback will take over and oscillations will start.

More specifically, with transistors Qax and Qby being pulsed into conduction, current will start flowing from bus bar X (which is at B+ potential) through transistor Qax, through the primary windings of feedback transformers Tax and Tay, through the parallel-combination of inductor L and load W, through the primary windings of feedback transformers Tbx and Tby, the through transistor Qby to bus bar Y (which is at B— potential).

With transformer winding polarities as shown, the current flowing through the primary windings of Tax and Tby will cause current to flow out of the corresponding secondary windings and into the base-emitter junctions of transistors Qax and Qby, respectively—keeping these two transistors in a conductive state for as long as current thusly flows. Similarly, with winding polarities as shown, the current flowing through the primary windings of Tbx and Tay will cause current to flow out of the corresponding secondary windings and—not into the base-emitter junctions of transistors Qbx and Qay—but also base-emitter shunting diodes Dbx and Day, respectively.

Current will continue to flow into the base-emitter junctions of transistors Qax and Qby, thereby keeping these transistors in the conductive state for as long as transformers Tax and Tby remain non-saturated. After transformer saturation occurs, however, the current flowing into these base-emitter junctions will cease flowing; and the transistors will now—as soon as the charges stored in the base-emitter junctions have been removed or otherwise dissappeared—cease conducting. (Using ordinary power switching transistors—such as Motorola Type MJE13006's—in the circuit illustrated, the time it takes for these stored charges to disappear is on the order of 1 micro-second.).

Transformer Tax is designed such as to provide current to the base-emitter junction of transistor Qax for a period of about 10 micro-seconds before saturation occurs; while transformer Tby is designed such as to provide current to the base-emitter junction of transistor Qby for a period of about 15 micro-seconds before saturation occurs.

Thus, as long as transistors Qax and Qby are both conducting, current flows from B+, through transistor Qax, through the primary windings of current-transformers Tax and Tay, out of output terminal Oa, through the parallel-combination of inductor L and load W, into output terminal Ob, through the primary windings of current-transformers Tbx and Tby, through transistor Qby, and to B—.

After conducting for about 10 micro-seconds, transformer Tax saturates and, about 1 micro-second thereafter, transistor Qax is rendered non-conductive. By the time that occurs, inductive energy has been stored up in inductor L, and current will therefore continue to flow out of output terminal 06. However, since transistor Qax is no longer conductive, this current will now flow as follows: from B—, through base-emitter shunting diode Day, through the base-collector junction of transistor Qay, through the primary windings of transformers Tax and Tay, out through terminal Oa, through the parallel-combination of inductor L and load W, into terminal Ob, through the primary windings of transformers Tbx and Tby, through transistor Qby, and back to B—. Thus, after transistor Qax is rendered non-cnductive and until the next part of the oscillation cycle, the net voltage presented across output terminals Oa and Ob is substantially zero.

With the inductive discharge current flowing from B— and back to B—, with only relatively small voltage drops to overcome in its path, it will continue to flow for a substantial length of time—long enough, without substantial attenuation, for the next part of the oscillation cycle to get initiated.

The next part of the oscillation cycle is initiated when current-transformer Tby saturates, which occurs about 5 microseconds after the saturation of Tax. And, about 1 micro-second after Tby saturates, transistor Qby is rendered non-conductive.

With transistor Qby non-conductive, the inductive discharge current cannot flow through Qby any longer, and will instead start flowing through the load W. Thus, with the inductive discharge current now flowing within the closed loop consisting of inductor L and load W, the current that was flowing through the primary windings of all four feedback transformers, thereby keeping them in saturation, has suddenly disappeared.

This relatively sudden disappearance of the transformer primary currents will, due to a small amount of inductive energy stored within each of the feedback transformers, cause brief voltage pulses to appear across the secondary windings of the feedback transformers. With winding polarities as shown and at this particular point in the oscillation cycle, these voltage pulses will be of such polarity as to have no effect on transistors Qax and Qby, but will provide for transistors Qay and Qbx to start conducting.

Once transistors Qay and Qbx have been initiated into conduction, positive feedback will take over and the next part of the oscillation cycle will start.

This next part of the oscillation cycle is identical with the initial part of the oscillation cycle, except that component roles have changed: the roll of transistor Qax has been taken over by transistor Qbx; the role of transistor Qby has been taken over by transistor Qay; the role of transistor Tax has been taken over by transformer Tbx; the role of transformer Tby has been taken over by transformer Tay; the role of diode Dax has been taken over by diode Dbx; and the role of diode Dby has been taken over by diode Day.

Figure 2:
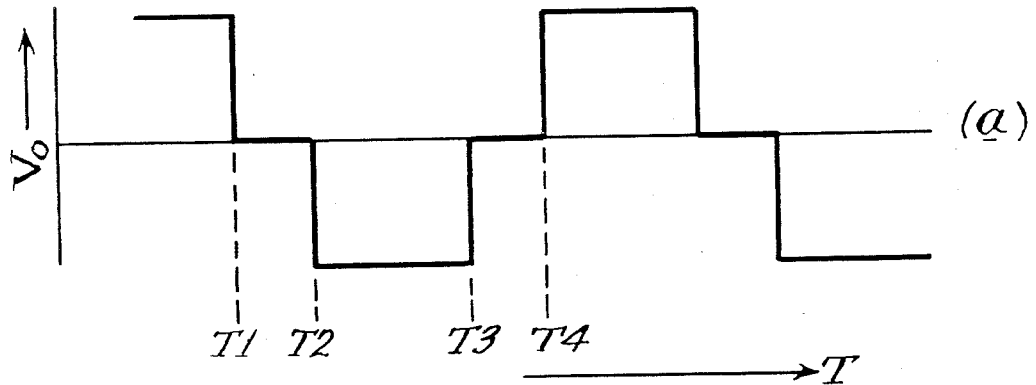
FIGS. 2a and b illustrate selected waveforms associated with the inverter circuit of FIG. 1.
Figure 2:
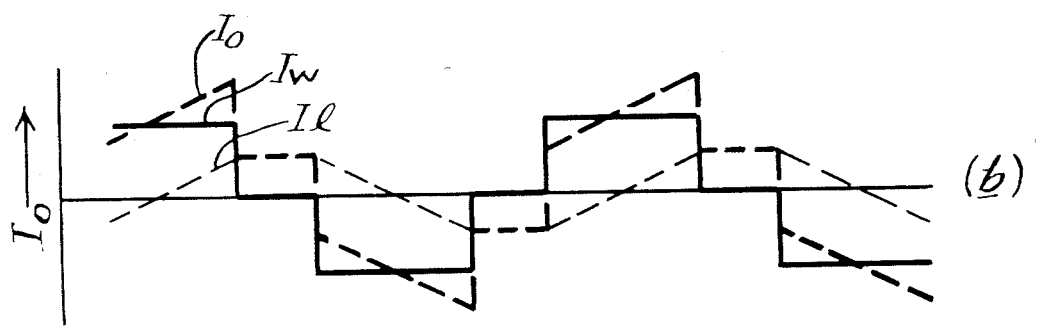

FIG. 2(a) illustrates versus time T the inverter output voltage Vo as it is provided across output terminals Oa and Ob. The point in time identified as T1 corresponds to the time at which transistor Qax is rendered non-conductive; T2 corresponds to the time at which transistor Qby is rendered non-conductive, which is also substantially the time at which transistors Qbx and Qay starts conducting; T3 corresponds to the time at which transistor Qbx is rendered non-conductive; and T4 corresponds to the time at which transistor Qay is rendered non-conductive, which is also substantially the time at which transistors Qax and Qby starts conducting again.

FIG. 2(b) illustrates versus time T the waveshape of the current Io flowing from output terminal Oa under the condition of the load W being a simple resistive load. Also shown are: I1, which is the current flowing through inductor L; and Iw, which is the current flowing through the resistive load W.

The purpose of having an inductor L connected in parallel with the load W in the inverter circuit of FIG. 1 is that of assuring the presence of the zero-output-voltage periods in the oscillation cycle: the periods between T1 and T2, and between T3 and T4. Without the combined output load having a net parallel inductive component, the zero-output-voltage periods would not have occurred; and the inverter circuit would then have provided the more conventional squarewave voltage output.

The purpose of switch S, in addition to providing a means by which to initiate circuit oscillation (which is accomplished by momentarily placing the switch in the position whereby terminal S1 connects with terminal S3) is that of providing a means for stopping the oscillation; which can be accomplished at any time by momentarily placing the switch in the position whereby terminal S3 connects with terminal S2; which has the effect of momentarily shorting feedback transformers Tax and Tby, thereby momentarily shorting out the feedback.

Re-starting the oscillations can simply be accomplished by momentarily re-connecting terminal S1 with terminal S2.

It is emphasized that the feedback transformers are of the current-transformer type with a current-transformation ratio of 4-to-1 or so. Consequently, the voltage developed across their primary windings is only on the order of a few tenths of one Volt. Thus, except for this very modest effect of the current feedback, the load and the parallel-connected inductor means are connected directly between the Qa and the Qb junctions.

One implication of the load-inductor combination being connected between the Qa and the Qb junctions is that this load-inductor combination is in effect voltage-clamped to the voltage present across capacitor Cxy; which clamping is accomplished by way of the base-collector junctions in association with the base-emitter shunting diodes—the primary windings of the feedback transformers providing negligible effect upon this clamping.

It is noted that even if the base-emitter shunting diodes had not been present, the indicated clamping effect would still have taken place—except that clamping current would then have had to flow in the reverse direction between the base-emitter junctions. In such a case, however, because of a not insignificant voltage drop across the base-emitter junction when current through it is flowing in the reverse direction, a normally unacceptable additional amount of power dissipation will result.

For absolute minimum power dissipation in connection with the clamping effect, it is noted that shunting diodes could be used across the collector-emitter terminals of the transistors instead of across the base-emitter junctions. However, in this case the reverse voltage requirements of the diodes would be much more severe.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. An inverter circuit adapted to be powered from a source of DC voltage and operative to provide an AC output for a load, said source of DC voltage having a B+ terminal and a B− terminal, said circuit comprising:

a first pair of transistor switching means connected in series with one another at a first junction to form a first series-pair, each of said transistor switching means having a pair of switching control terminals, said first series-pair being connected between said B+ terminal and said B− terminal;

a second pair of transistor switching means connected in series with one another at a second junction to form a second series-pair, each of said transistor switching means having a pair of switching control terminals, said second series-pair being connected between said B+ terminal and said B− terminal;

positive feedback drive means connected in circuit between said junctions and said pairs of switching control terminals, said drive means being operative to drive said series-pairs in alternating push-pull fashion such as to provide between said junctions an output voltage characterized by alternating back and forth between a substantially constant-magnitude positive voltage and a substantially constant-magnitude negative voltage, but with a distinct period between each alternation where the output voltage is substantially of zero magnitude; and electrical connection means connected in circuit with said junctions and operative to provide said AC output for said load.

2. The inverter circuit of claim 1 wherein an inductance means is connected in circuit with said junctions.

3. The inverter circuit of claim 1 wherein said drive means comprises a first and a second saturable inductor means, said saturable inductor means being operative to determine the length of said distinct period.

4. The inverter circuit of claim 3 wherein said first saturable inductor means has a saturation period that is distinctly longer than that of said second inductor means.

5. The inverter circuit of claim 1 and rectifier means connected in circuit with each transistor means.

6. An inverter circuit adapted to be powered from a source of DC voltage and operative to provide an AC output voltage for a load, said source of DC voltage having a B+ terminal and a B− terminal, said circuit comprising:

a first pair of transistor switching means connected in series with one another at a first junction to form a first series-pair, each of said transistor switching means having a pair of switching control terminals, said first series-pair being connected between said B+ terminal and said B− terminal;

a second pair of transistor switching means connected in series with one another at a second junction to form a second series-pair, each of said transistor switching means having a pair of switching control terminals, said second series-pair being connected between said B+ terminal and said B− terminal;

positive feedback drive means connected in circuit between said junctions and said pairs of switching control terminals, and operative to drive said series-pairs in alternating push-pull fashion such as to provide between said junctions an output voltage cyclically passing through four distinct time periods: (i) a first period during which the output voltage is of substantially constant positive magnitude, (ii) a second period during which the output voltage is of substantially zero magnitude, (iii) a third period during which the output voltage is of substantially constant negative magnitude, and (iv) a fourth period during which the output voltage is of substantially zero magnitude; and electrical connection means connected in circuit with said junctions and operative to provide said AC output voltage for said load.

7. The inverter circuit of claim 6 wherein said first and third periods are substantially of equal durations, and where said second and fourth periods are also substantially of equal durations.

8. The inverter circuit of claim 7 wherein said second and fourth periods each is of about half the duration as that of each of said first and third periods.

9. The inverter circuit of claim 6 wherein said drive means comprises a first and a second saturable inductor means, which inductor means are non-coupled to each other.

10. The inverter circuit of claim 9 wherein said first inductor means saturates more readily than said second inductor means.

11. A self-oscillating inverter circuit adapted to be powered from a source of DC voltage and operative to provide an AC output voltage for a load, said source of DC voltage providing its output between an X-terminal and a Y-terminal, said circuit comprising:

I. four transistors, Qax, Qay, Qbx and Qby, each having an emitter, a collector and a base, said four transistors being connected between said X-terminal and said Y-terminal in such a way that: (i) transistors Qax and Qbx are connected with their collectors to said X-terminal, (ii) transistors Qay and Qby are connected with their emitters to said Y-terminal, (iii) transistor Qax is connected with its emitter to an output connection point Qa, to which the collector of transistor Qay is also connected, and (iv) transistor Qbx is connected with its emitter to an output connection point Qb, to which the collector of transistor Qby is also connected;

II. output connection means operative to permit connection of said load in circuit between said output connection points, Qa and Qb; and III. positive feedback means connected in circuit between the bases of said four transistors and said output connection points Qa and Qb, said feedback means operative to provide current drive to the bases of said four transistors in cyclic alternation between transistors Qax and Qby, and transistors Qay and Qbx, whereby transistors Qax and Qby are rendered conductive in alternating fashion with transistors Qdx and Qay, the length of the period during which transistor Qax is rendered conductive being distinctly different from that during which Qby is rendered conductive, and the length of the period during which transistor Qbx is rendered conductive being distinctly different from that during which Qay is rendered conductive;

whereby said AC output voltage, which is provided between connection points Qa and Qb, may be characterized by four cyclically re-occurring time periods: (i) a first period of a substantially constant-magnitude positive voltage, (ii) a second period of substantially zero-magnitude voltage, (iii) a third period of a substantially constant-magnitude negative voltage, and (iv) a fourth period of substantially zero-magnitude voltage.

12. A controlled inverter adapted to be powered from a DC source and to provide an AC voltage across a pair of output terminals, said inverter comprising:

switching transistors arranged in push-pull configuration and connection with said DC source, said push-pull configuration having a pair of output terminals, each one of said transistors being operative by way of a set of switching control input terminals to be switched between an ON-state and an OFF-state; and positive feedback switching control means connected in circuit between said output terminals and each one of said transistors' control input terminals and operative to control the ON-states and OFF-states of the transistors such that the voltage provided across said pair of output terminals can be characterized by four cylically re-occurring time periods; (i) a first period of a substantially constant-magnitude positive voltage, (ii) a second period of substantially zero-magnitude voltage, (iii) a third period of a substantially constant-magnitude negative voltage, and (iv) a fourth period of substantially zero-magnitude voltage.

* * * * *